United States Patent
Li

(10) Patent No.: US 8,944,591 B2
(45) Date of Patent: Feb. 3, 2015

(54) EYEGLASSES ASSEMBLY STRUCTURE

(71) Applicant: Sun Sight Glasses Co., Ltd., Tainan (TW)

(72) Inventor: I-Nan Li, Tainan (TW)

(73) Assignee: Sun Sight Glasses Co., Ltd., Tainan (TW)

( * ) Notice: Subject to any disclaimer, the term of this patent is extended or adjusted under 35 U.S.C. 154(b) by 55 days.

(21) Appl. No.: 13/917,834

(22) Filed: Jun. 14, 2013

(65) Prior Publication Data

US 2014/0368785 A1    Dec. 18, 2014

(51) Int. Cl.
G02C 5/22    (2006.01)
G02C 5/14    (2006.01)
G02C 3/00    (2006.01)

(52) U.S. Cl.
CPC . G02C 5/14 (2013.01); G02C 3/003 (2013.01)
USPC .............. 351/153; 351/116; 351/156; 16/228

(58) Field of Classification Search
USPC ................ 351/153, 116, 156, 113, 111, 157; 16/228
See application file for complete search history.

(56) References Cited

U.S. PATENT DOCUMENTS

| | | | | | |
|---|---|---|---|---|---|
| 2,210,507 | A | * | 8/1940 | Spill | 351/116 |
| 3,744,887 | A | * | 7/1973 | Dunbar | 351/153 |
| 4,978,209 | A | * | 12/1990 | Ohba | 351/153 |
| 5,359,370 | A | * | 10/1994 | Mugnier | 351/41 |
| 5,426,473 | A | * | 6/1995 | Riehm | 351/121 |
| 5,844,655 | A | * | 12/1998 | Chang | 351/153 |
| 5,847,801 | A | * | 12/1998 | Masunaga | 351/153 |
| 5,898,471 | A | * | 4/1999 | Simioni et al. | 351/153 |
| 7,175,276 | B1 | * | 2/2007 | Hsiung | 351/120 |
| 7,422,322 | B2 | * | 9/2008 | He | 351/153 |
| 8,371,692 | B2 | * | 2/2013 | LaGace et al. | 351/153 |

* cited by examiner

*Primary Examiner* — Hung Dang
(74) *Attorney, Agent, or Firm* — Rosenberg, Klein & Lee

(57) ABSTRACT

An eyeglasses assembly structure is provided, in which assembly slots for joint members are mainly formed on both sides of the eyeglasses frame, and the joint members are pivotally connected therein. Locating members are respectively interposed between upper and lower elastic elements for holding the pivotal connection status of the joint members and the assembly slots. When the joint members are to be detached from the assembly slots, the locating members are pushed into sliding grooves of the joint members, and the upper and the lower elastic elements are pressed to be deflected inward so as to allow the upper and the lower pivots detached from the pivotal connection with the assembly slots. Therefore, temples or strap can be assembled on the rear ends of the joint members and then the eyeglasses patterns can be conveniently transformed according to users' needs.

10 Claims, 6 Drawing Sheets

EYEGLASSES ASSEMBLY STRUCTURE

BACKGROUND OF THE INVENTION

1. Field of the Invention

The present invention relates to an eyeglasses assembly structure, more particularly to an eyeglasses assembly structure enabling the change of either temples or strap on frame.

2. Brief Description of Prior Arts

Generally, eyeglasses available on the market have diversified functions and styles. According to the functions, Eyeglasses can be substantially divided into exercise eyeglasses, sun glasses, presbyopic and myopia eyeglasses for vision correction. Among them, the exercise eyeglasses are mainly for users to wear in strenuous exercises, so as to prevent the eyeglasses from falling off in vigorous activities such as jogging or jumping. Hence, stability in wearing is more emphasized in the exercise eyeglasses than ordinary eyeglasses. Current exercise eyeglasses structure mainly have lens mounting apertures provided on the frame thereof so as to allow the lenses to be mounted therein, and perforations are also formed on both sides of the frame so that a strap can combine its two ends in the perforations of the frame. When wearing the exercise eyeglasses, users can tie the strap of the exercise eyeglasses on the head. In this manner, users can avoid the eyeglasses from falling off in strenuous dynamic exercise such as jogging or playing ball by the strap tying around the head.

When users want to engage in sedentary activities such as reading, word processing or attending formal occasions, they mostly wear ordinary eyeglasses having temples attached thereto, as ordinary eyeglasses having temples are more comfortable without the binding feeling of being tied tightly by the strap on head. Besides, ordinary eyeglasses look more aesthetic and are easier to match with costumes, so most ordinary users may purchase both exercise and ordinary eyeglasses to cope with both occasions of conducting dynamic as well as sedentary activities. Substantially, the exercise eyeglasses and the ordinary eyeglasses are designed in such a manner as to have the same elements and functions as well except the difference of arrangement of either a strap or temples. However, since users have to buy both types of exercise eyeglasses and ordinary eyeglasses, and this not only results in economic burden of users but also the exercise eyeglasses are often idled in the room corner when not in use, resulting in waste of resource.

In view of the above disadvantages on the design of conventional eyeglasses, the inventor of the present invention hereby proposes the present invention according to his long-term abundant experience in development and manufacturing activities in relevant fields, and based on the improvement conducted on the conventional eyeglasses structure.

SUMMARY OF THE INVENTION

The main object of this invention is to provide an eyeglasses assembly structure enabling the change of temples or straps on frame.

The above object and effect can be achieved by the following eyeglasses assembly structure.

The eyeglasses assembly structure of the present invention mainly comprises:

a frame having two assembly slots for joint members formed on both sides thereof, and upper pivot holes and lower pivot holes being respectively provided on the upper and lower walls of the assembly slots;

two joint members respectively assembled in the assembly slots of the frame, upper elastic elements and lower elastic elements being separately formed at the front ends of the two joint members respectively, and pivots being provided respectively on the upper end faces of the upper elastic elements and the bottom end faces of the lower elastic elements, so as to pivotally connected with the upper pivot holes and the lower pivot holes of the assembly slots on the frame, sliding grooves being formed on the two joint members and the sliding grooves being made to correspond to gaps formed between the upper elastic elements and the lower elastic elements. Further, a guiding rod disposed vertically being assembled in each sliding groove;

two locating members respectively assembled in the sliding grooves of the two joint members, lengthwise guide slots being respectively formed at the centers of the locating members and the guiding rods of the joint members being positioned in the guide slots.

According to the eyeglasses assembly structure, the locating members have openings formed at one sides thereof, and the openings are communicated with the guide slots of the locating members.

According to the eyeglasses assembly structure, the locating members are each formed with a knob unit on one side face thereof.

According to the eyeglasses assembly structure, each of the two joint members has a temple integrally formed on the rear end thereof.

According to the eyeglasses assembly structure, each of the two joint members is formed with a perforation for strap, and a strap is provided with its both ends respectively passing through and fastened on the perforations of the two joint members.

In this manner, by assembling temples or strap on the rear ends of the two joint members, users can easily change the mounting of either temples or a strap on the eyeglasses so as to form either exercise eyeglasses or ordinary eyeglasses according to users' needs. Not only economic burden of purchasing both types of eyeglasses can be reduced but also material resource can be effectively employed by exploit only one eyeglasses as exercise eyeglasses or ordinary eyeglasses.

BRIEF DESCRIPTION OF ACCOMPANYING DRAWINGS

The present invention will be better understood by the detailed description of a preferred embodiment with reference to the accompanied drawings, in which.

DETAILED DESCRIPTION OF PREFERRED EMBODIMENTS

The technical contents, objects and effect of the present invention will become more apparent by the detailed description in conjunction with the accompanied drawings.

Figure 1:
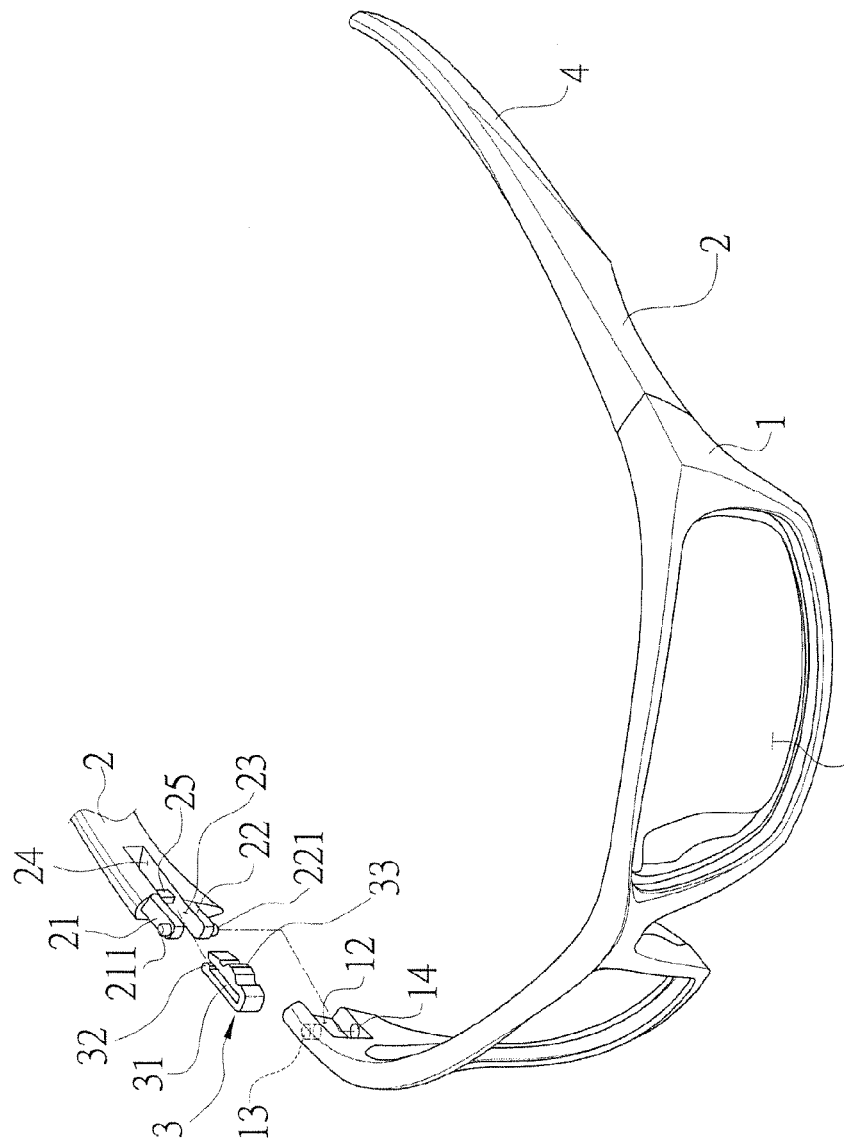
FIG. 1 is a perspective exploded view of the present invention.

Referring to FIG. 1, the eyeglasses assembly structure of the present invention mainly comprises a frame (1), two joint members (2), two locating members (3) and two temples (4). The frame (1) has two symmetrical lens mounting apertures (11) provided thereon for mounting two lenses, and two assembly slots (12) for joint members formed on the inner faces of both sides thereof. Each assembly slot (12) has an upper pivot hole (13) and a lower pivot hole (14) provided on the upper and lower walls respectively.

Each of the two joint members (2) has an upper elastic element (21) and a lower elastic element (22) separately formed at the front end thereof, and pivots (211), (221) are provided respectively on the upper end face and the bottom end face of the upper elastic element (21) and the lower elastic element (22), so as to connecting pivotally with the upper pivot hole (13) and the lower pivot hole (14) of the assembly slot (12). Each of the two joint members (2) has a sliding groove (24) which is formed to extend from a gap (23) between the upper elastic element (21) and the lower elastic element (22), and a guiding rod (25) disposed vertically is assembled in each sliding groove (24). Further, the temples (4) are respectively formed integrally at the rear ends of the two joint members (2).

Each of the two locating members (3) is assembled in the sliding groove (24) of the joint member (2), and a lengthwise guide slot (31) is formed at the center of the locating member (3), and the guiding rod (25) of the joint member (2) is positioned in the guide slot (31). Further, each of the locating members (3) has an opening (32) formed on one side so as to communicate with the guide slot (31). Moreover, each of the locating member (3) has a wave-shape knob unit (33) formed on one face corresponding to the inner side of the joint member (2).

Configuring like this, when conducting assembly as shown in FIG. 1, each of the locating members (3) is placed into the sliding groove (24) of the joint member (2), and the vertically disposed guide rod (25) in the sliding groove (24) is inserted into the lengthwise guide slot (31) of the locating member (3) from the opening (32) formed at one side of the locating member (3), so that the locating member (3) and the joint member (2) can be assembled with each other.

Figure 2:
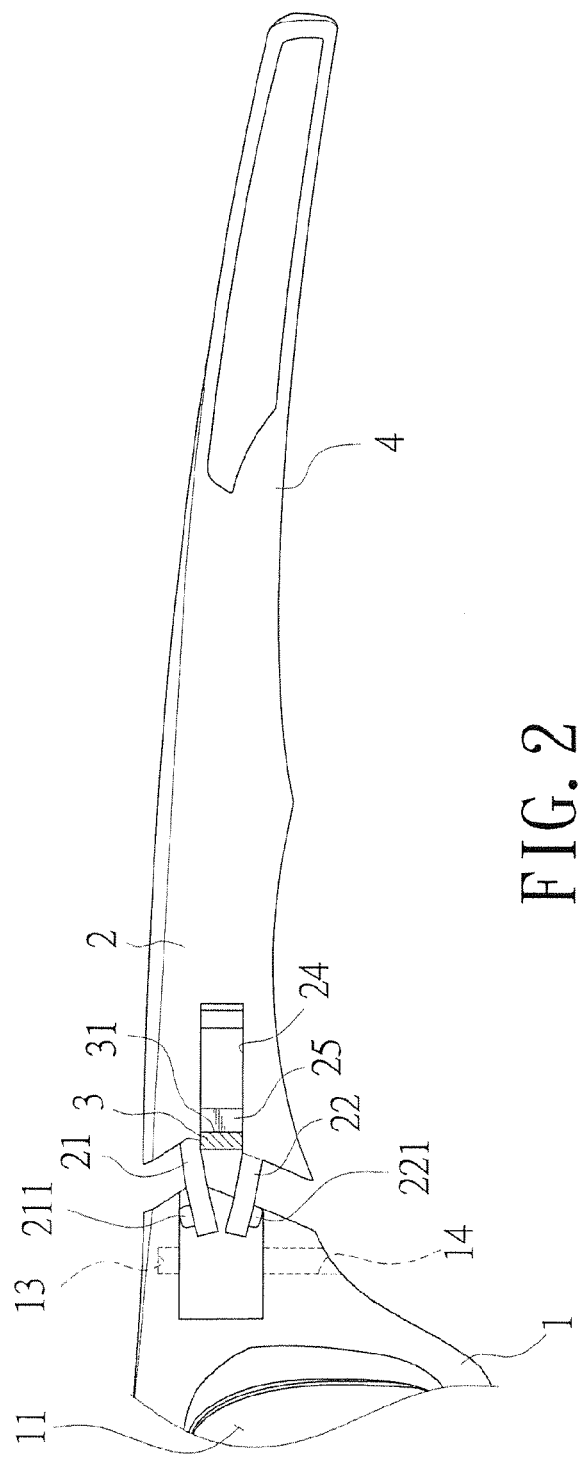
FIG. 2 is a view showing the upper and the lower elastic elements of the present invention in compression state.

Next, each of the joint members (2) combined with the corresponding locating member (3) is assembled to the frame (1). Referring to FIG. 2, when assembling each joint member (2) to the frame (1), the upper and the lower elastic elements (21), (22) are pressed and thus deflected toward the gap (23), so that both the upper and the lower elastic elements (21), (22) are able to be placed into the assembly slot (12). In turn, the pressing on both the elastic elements (21), (22) is released and both the elastic elements (21), (22) are recovered back to their original positions. Thereby, the pivots (211), (221) provided respectively on the upper end face of the upper elastic element (21) and the bottom end face of the lower elastic element (22) are inserted into the upper and the lower pivot holes (13), (14) respectively provided on the upper and lower walls of the assembly slot (12), so that the joint member (2) and the temple (4) integrally formed at the rear end thereof can be connected pivotally with the frame (1). Alternatively, each joint member (2) is firstly inclined a certain angle so that the upper pivot (211) on the upper elastic element (21) can be inserted into the upper pivot hole (13) on the assembly slot (12) of the frame (1), and then the joint member (2) is shifted to the right place so that the pivot (221) on the lower elastic element (22) can be mounted on the lower pivot hole (14) on the assembly slot (12) of the frame (1). In this manner, the joint member (2) with the temple (4) integrally formed at the rear end thereof can be connected pivotally with the frame (1).

Figure 3:
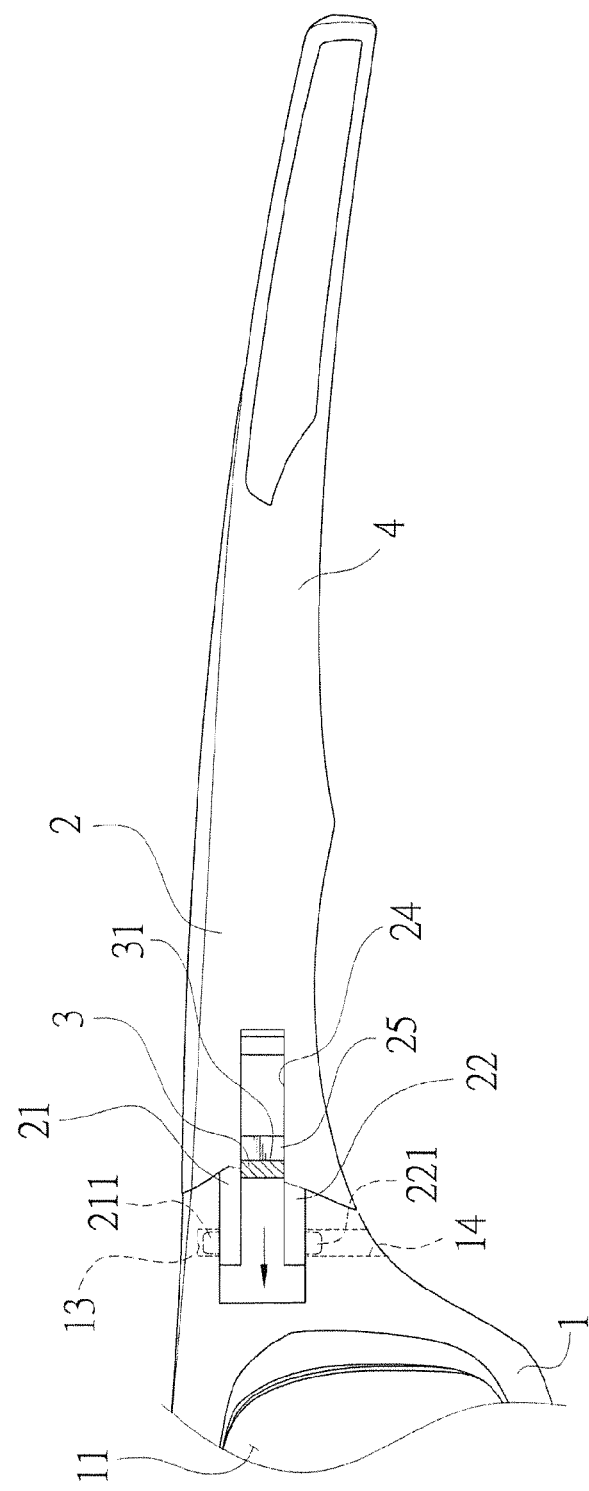
FIG. 3 is a view showing the joint member of the present invention in sliding state.
Figure 4:
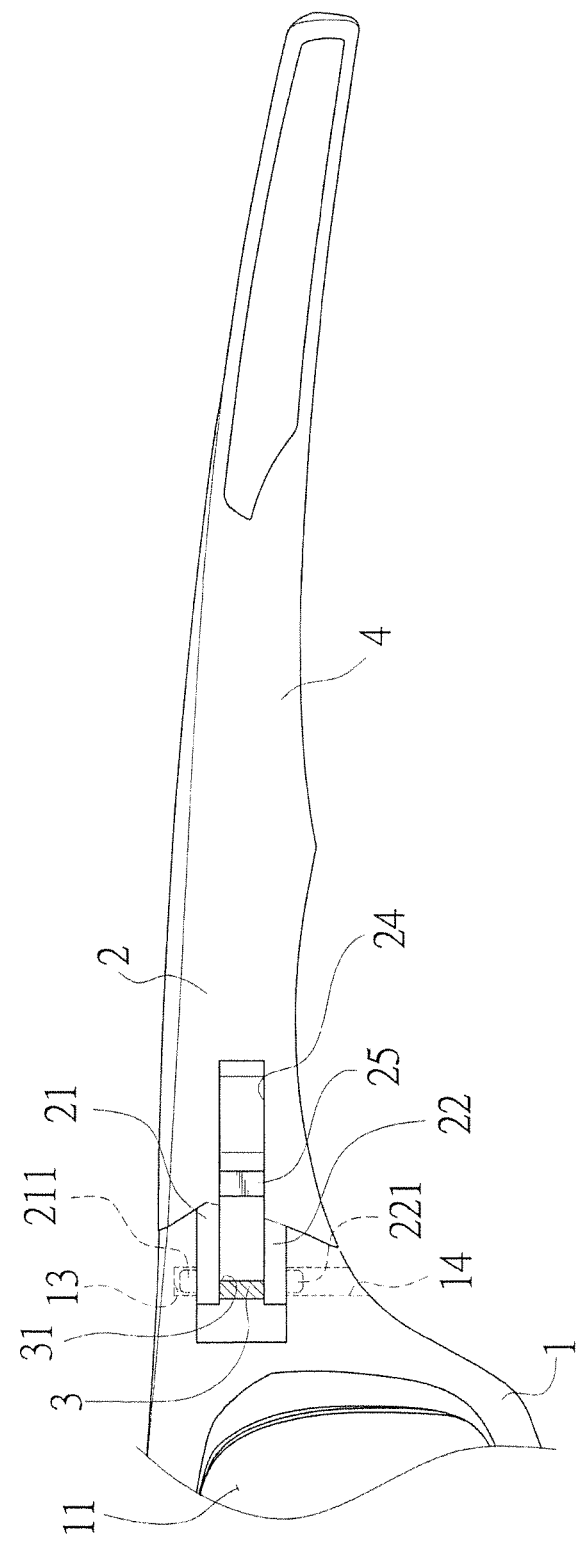
FIG. 4 is a view showing the joint member of the present invention in location state.
Figure 5:
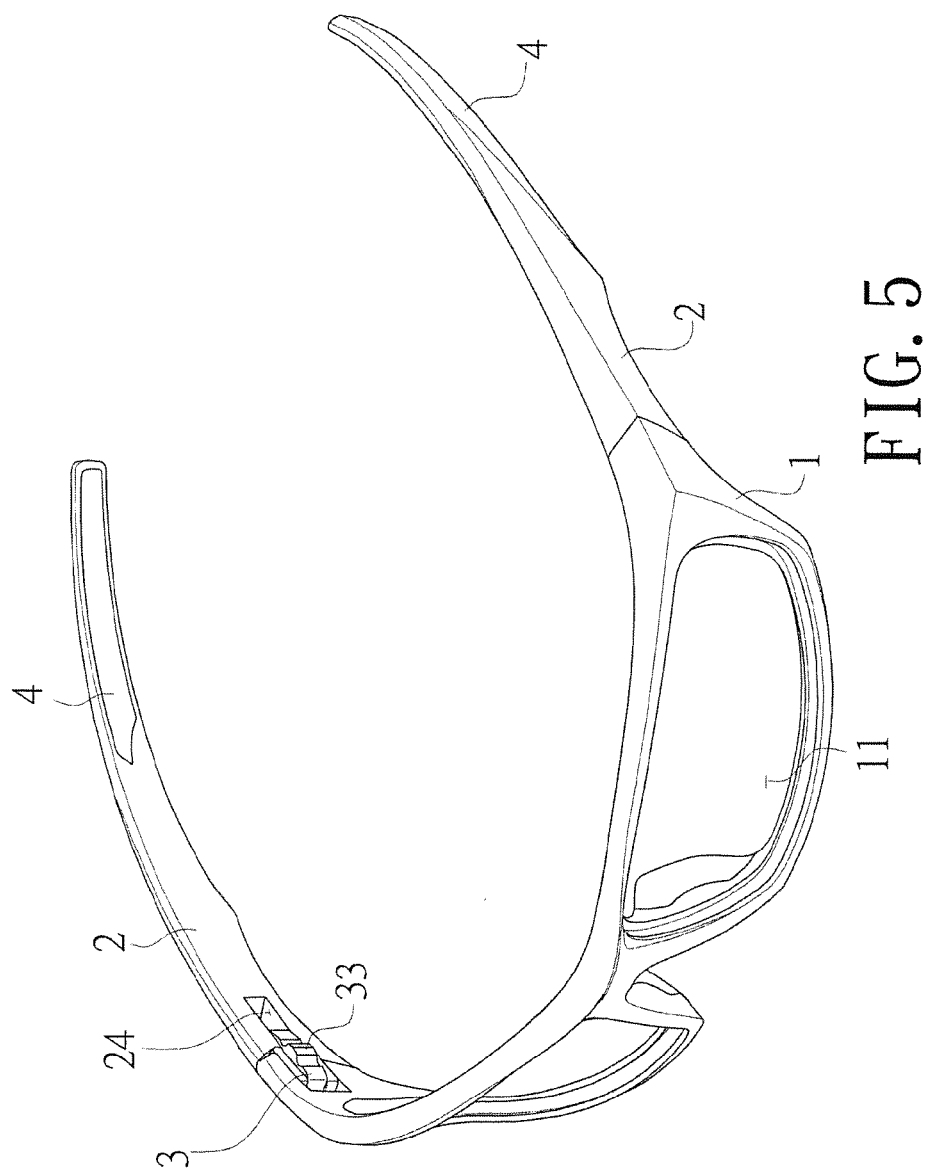
FIG. 5 is a view showing the assembly of the present invention is accomplished state.

Next, referring to FIG. 3, users press the wave shape knob unit (33) formed on the inner face of each locating member (3) so as to push the locating member (3) assembled in the sliding groove (24) of the joint member (2) toward the gap (23) formed between the upper elastic element (21) and the lower elastic element (22), and the locating member (3) is finally positioned between the upper elastic element (21) and the lower elastic element (22) to support the both elements. Simultaneously, the upper elastic element (21) and the lower elastic element (22) hold the locating member (3) by their elasticity, so that the upper elastic element (21) and the lower elastic element (22) are not deflected toward the gap (23) by the blocking of the locating member (3) held therebetween, as shown in FIG. 4. Therefore, the pivotal connection between the two joint members (2) and the frame (1) can be firmly maintained and the temples (4) integrally connected with the joint members (2) are also connected pivotally on the frame (1). Referring to FIG. 5, users can wear the eyeglasses with the temples (4) provided thereon for sedentary activities such as reading, word processing, or for attending formal occasion.

On the other hand, when users want to conduct exercise like jogging, playing ball and to change the eyeglasses into exercise use, the two joint members (2) with the temples (4) integrally formed thereon can be detached from the frame (1). When each joint member (2) is to be detached, users press the wave-shape knob unit (33) formed on the inner face of each locating member (3) so as push the locating member (3) positioned at the gap (23) between the upper elastic element (21) and the lower elastic element (22) toward the sliding groove (24) of the joint member (2). When the joint member (2) completely enters the sliding groove (24), the gap (23) between the upper elastic element (21) and the lower elastic element (22) becomes void so that users can press and thus deflect the upper elastic element (21) and the lower elastic element (22) toward the gap (23). Then, the pivot (211), (221) respectively provided on the upper face of the upper elastic element (21) and the bottom face of the lower elastic element (22) can be retracted from the upper and the lower pivot holes (13), (14) respectively provided on the upper and lower walls of the assembly slot (12), so as to release the pivotal connection between the joint member (2) and the assembly slot (12) of the frame (1). In this manner, the disassembly between the joint members (2) with the temples (4) integrally formed thereon and the frame (1) is thus accomplished.

Figure 6:
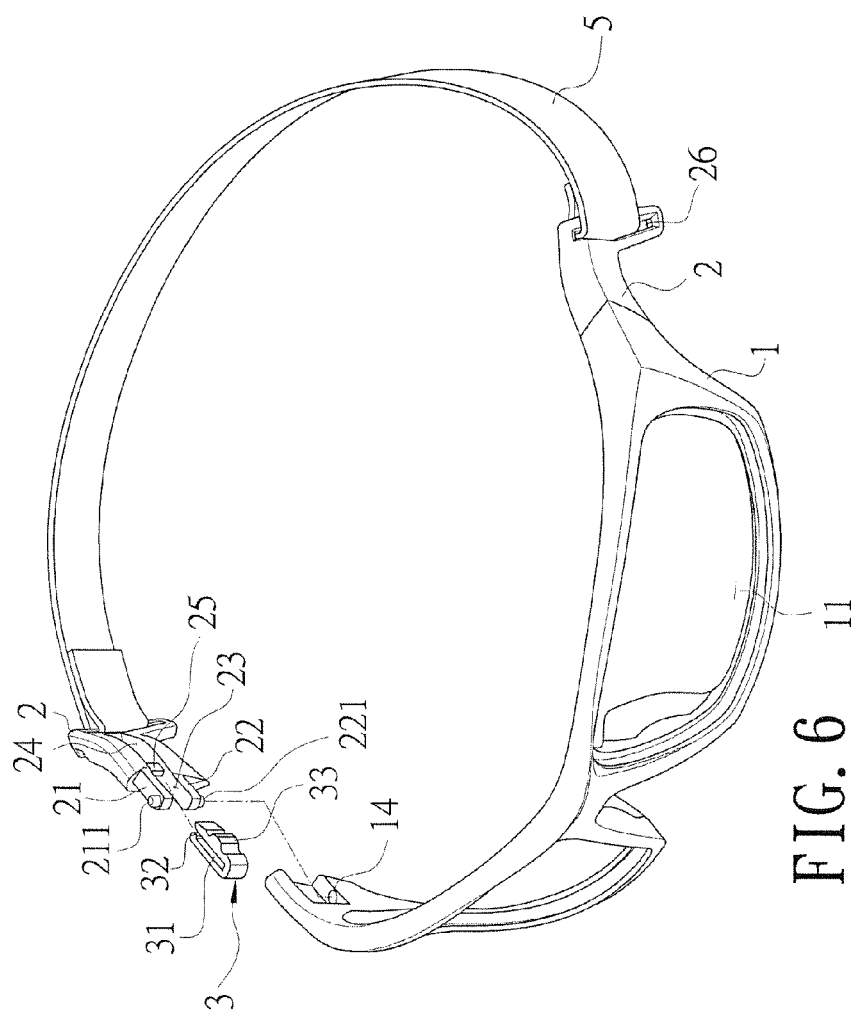
FIG. 6 is a perspective view of another embodiment of the present invention.

Referring to FIG. 6, after the two joint members (2) with the temples (4) integrally formed thereon are detached from the frame (1), users can assemble the two joint members (2) with a strap (5) tied thereon to the frame (1). Each joint member (2) with the strap (5) tied thereon has a strap perforation (26) formed at its rear end for tying with the strap (5). In turn, according to the steps as stated above, the pivot (211), (221) respectively provided on the upper face of the upper elastic element (21) and the bottom face of the lower elastic element (22) of the joint member (2) are inserted respectively into the upper and the lower pivot holes (13), (14) provided respectively on the upper and lower walls of the assembly slot (12), and then the locating member (3) is pushed into the gap (23) formed between the upper elastic element (21) and the lower elastic element (22) so as to be held therein. Therefore, the pivotal connection between the pivot (211), (221) and the upper and the lower pivot holes (13), (14) can be steadily maintained. In this manner, users can wear the eyeglasses having the strap (5) tied thereon for vigorous dynamic activities.

Configuring in this manner, by the design of the two joint members with either temples (4) or the strap (5) assembled at the rear ends, users can easily make the transformation into the eyeglasses with either the temples (4) or the strap (5) so as to form the type of ordinary eyeglasses or exercise eyeglasses. Therefore, there is no need to purchase both types of ordinary eyeglasses and exercise eyeglasses. Not only economic burden of purchasing both types of eyeglasses can be reduced but also material resource can be effectively employed by exploit only one eyeglasses as exercise eyeglasses or ordinary eyeglasses.

While the present invention has been described by preferred embodiments in conjunction with accompanying drawings, it should be understood the embodiments and the drawings are merely for descriptive and illustrative purpose, not intended for restriction of the scope of the present invention. Equivalent variations and modifications conducted by person skilled in the art without departing from the spirit and scope of the present invention should be considered to be still within the scope of the present invention.

What is claimed is:

1. An eyeglasses assembly structure, comprising:
 a frame having two assembly slots for joint members formed on both sides thereof, and each of said two assembly slots having an upper pivot hole and a lower pivot hole respectively provided on the upper and lower walls of said assembly slot;
 two joint members assembled in said two assembly slots respectively provided at both sides of said frame, each of said joint member having an upper elastic element and a lower elastic element separately formed at the front end of said joint member, and pivots being provided respectively on the upper end face of the upper elastic element and the bottom end face of the lower elastic element so as to be pivotally connected with said upper pivot hole and said lower pivot hole of said corresponding assembly slot on said frame, each of said two joint members having a sliding groove which is formed to correspond to a gap between said upper elastic element and said lower elastic element; a guiding rod disposed vertically being assembled in said sliding groove;
 two locating members each of which is assembled in said sliding groove of said corresponding joint member, and a lengthwise guide slot being formed at the center of said locating member and said guiding rod of said joint member being positioned in said guide slot.

2. The eyeglasses assembly structure as claimed in claim 1, wherein each of said two locating members has an opening formed at one side thereof, and said opening is communicated with said guide slot of said locating member.

3. The eyeglasses assembly structure as claimed in claim 2, wherein each of said two locating members is formed with a knob unit on one side face thereof.

4. The eyeglasses assembly structure as claimed in claim 3, wherein each of said two joint members has a temple integrally formed on the rear end thereof.

5. The eyeglasses assembly structure as claimed in claim 3, wherein said two joint members are respectively formed with perforations for strap, and a strap is provided with its both ends respectively passing through and fastened on said perforations of said two joint members.

6. The eyeglasses assembly structure as claimed in claim 2, wherein each of said two joint members has a temple integrally formed on the rear end thereof.

7. The eyeglasses assembly structure as claimed in claim 2, wherein said two joint members are respectively formed with perforations for strap, and a strap is provided with its both ends respectively passing through and fastened on said perforations of said two joint members.

8. The eyeglasses assembly structure as claimed in claim 1, wherein each of said two joint members has a temple integrally formed on the rear end thereof.

9. The eyeglasses assembly structure as claimed in claim 1, wherein said two joint members are respectively formed with perforations for strap.

10. The eyeglasses assembly structure as claimed in claim 9, wherein said eyeglasses assembly structure further has a strap provided with its both ends respectively passing through and fastened on said perforations of said two joint members.

\* \* \* \* \*